United States Patent [19]

Harms

[11] 3,876,234
[45] Apr. 8, 1975

[54] TWIST-LOCK CONNECTOR

[75] Inventor: Jack L. Harms, Lansdale, Pa.

[73] Assignee: Extracorporeal Medical Specialties, Inc., King of Prussia, Pa.

[22] Filed: Jan. 11, 1973

[21] Appl. No.: 322,710

[52] U.S. Cl. .................. 285/38; 285/332; 285/360; 285/423
[51] Int. Cl. .............................................. F16l 37/24
[58] Field of Search ............ 285/360, 38, 175, 423, 285/332, 358, 394, 401

[56] References Cited
UNITED STATES PATENTS

| | | | |
|---|---|---|---|
| 763,210 | 6/1904 | Schwamberger et al. | 285/38 X |
| 1,253,065 | 1/1918 | Looze | 285/360 X |
| 2,538,662 | 1/1951 | Abbott | 285/423 X |
| 3,540,757 | 11/1970 | Neher | 285/332 X |

*Primary Examiner*—Richard J. Scanlan, Jr.
*Assistant Examiner*—Moshe I. Cohen
*Attorney, Agent, or Firm*—Connolly and Hutz

[57] ABSTRACT

A twist-lock connector for joining together the ends of two pieces of tubing comprising one member which includes a female portion having an internal opening with an inner conical tapered sealing surface and another member which includes a hollow male portion having a protrusion with an outer conical matingly tapered sealing surface, and rotary cam means on the members for insuring that the tapered sealing surfaces are forced together into self-locking intimate frictional contact providing a fluid-tight connection and for precluding relative longitudinal motion between the two members tending accidentally to disengage the sealing surfaces. The male portion of one member includes at its mouth two spiral cam tracks disposed 180° apart in the manner of a double helix having a non-locking helix angle, and the male portion of the other cooperating member includes at its base two cam follower lugs disposed 180° from each other for cooperation with the cam tracks.

3 Claims, 6 Drawing Figures

PATENTED APR 8 1975　　3,876,234

3,876,234

TWIST-LOCK CONNECTOR

BACKGROUND OF THE INVENTION

The claimed invention relates to the field of connectors for quickly joining together the ends of two pieces of tubing in a manner which is quickly disengageable but resists accidental disconnection. Connectors of this general type are capable of a wide variety of uses, but are particularly useful in forming fluid-tight connections between pieces of flexible tubing utilized in a wide variety of medical and surgical devices in hospitals and similar environments. While not limited to such a use, the twist-lock connector of the present invention was developed for use on flexible sterile tubing associated with dialyzer cartridges for use in artificial kidney machines.

Prior to the present invention, connectors of this general type have been used for many years to effectuate rapid and effective junctions between pieces of tubing. A requirement of such connectors is that a fluid-tight seal be obtained with an easy and rapid manual motion not requiring complex maneuvering of the parts. Another requirement is that the connection, once made, should be strongly resistant to inadvertant disengagement, but should be readily disengageable when desired with a similar easy and rapid manual manipulation.

It has long been known that fluid-tight connections are provided by a pair of tapered members, one including a female portion having an internal opening with an inner conical tapered sealing surface, and the other member including a male portion having a protrusion with an outer conical matingly tapered sealing surface. Such connectors are far from foolproof, however, because to insure the desired fluid-tight connection the members must be forced longitudinally together, preferably with a slight twisting motion, with sufficient pressure to insure that the locking fricton angle of the tapered surfaces are jammed into intimate frictional contact. Even when the desired intimate contact providing the fluid-tight connection is established, moreover, an inadvertant longitudinal tugging between the tubes associated with the two members is often sufficient to disengage the connection and break the seal.

Thus, the problem heretofore unsolved by the prior art is the provision of simplified means to insure that the intimate frictional contact is established to provide the fluid-tight connection and to preclude relative longitudinal motion tending accidentally to disengage the sealing surfaces.

SUMMARY OF THE INVENTION

This invention provides a twist-lock connector for joining together the ends of two pieces of tubing comprising two cooperating members, one member including a female portion having an internal opening with an inner conical tapered sealing surface, the other member including a hollow male portion having a protrusion with an outer conical matingly tapered sealing surface, and rotary cam means associated with the two members whereby a small amount of relative rotary motion between the two members insures that the tapered sealing surfaces are forced together into self-locking intimate frictional contact and whereby relative longitudinal motion between the two members tending to disengage the sealing surfaces is precluded. To this end, the female portion of the one cooperating member includes two spiral cam tracks disposed 180° apart in the manner of a double helix having non-locking helix angles, and the male portion of the other cooperating member includes two cam follower lugs disposed 180° from each other for cooperation with the cam tracks.

BRIEF DESCRIPTION OF THE DRAWINGS

Numerous advantages of the present invention will become apparent to one skilled in the art from a reading of the detailed description in conjunction with the accompanying drawings wherein similar reference characters refer to similar parts, and in which.

DETAILED DESCRIPTION

Figure 1:
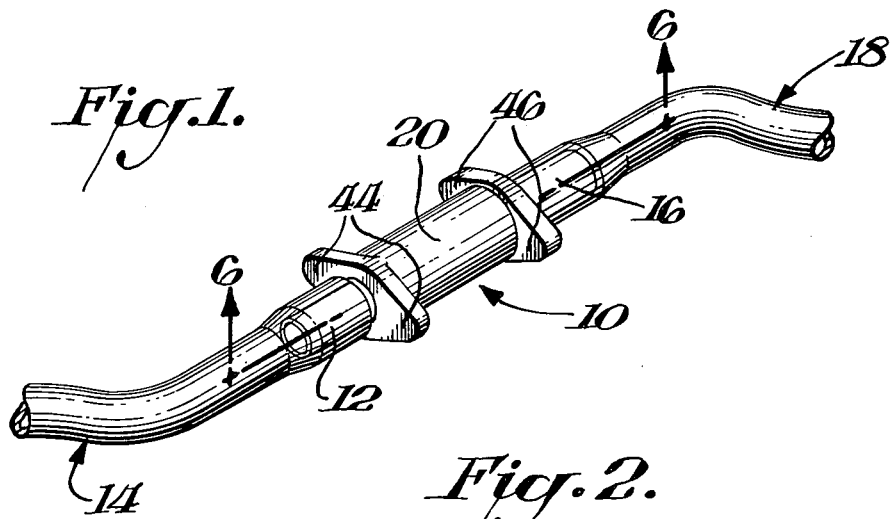
FIG. 1 is a perspective view of the twist-lock connector of the present invention in the locked condition.
Figure 2:
FIG. 2 is a plan view, with parts broken away, showing the two cooperating members of the twist-lock connector in the unlocked condition.
Figure 3:
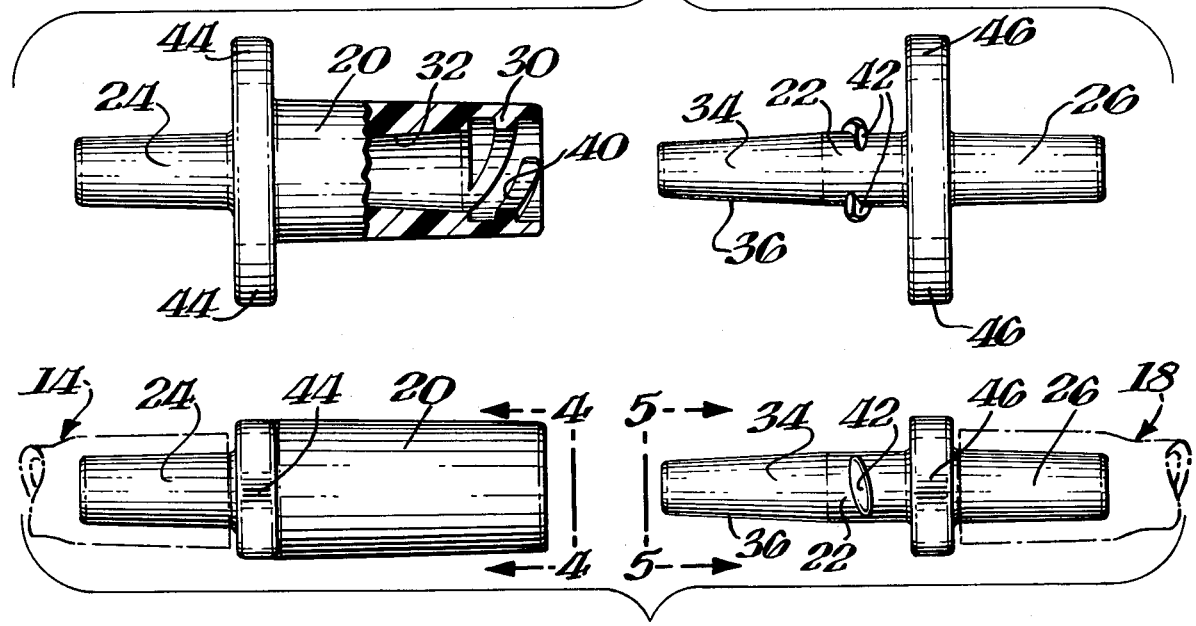
FIG. 3 is an elevational view showing the two cooperating members of the twist-lock connector in the unlocked condition.
Figure 4:
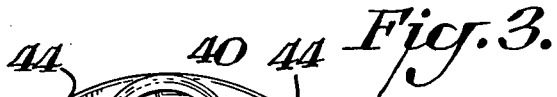
FIG. 4 is an end elevational view of the female member viewed from line 4—4 of FIG. 3.
Figure 4:
Figure 5:
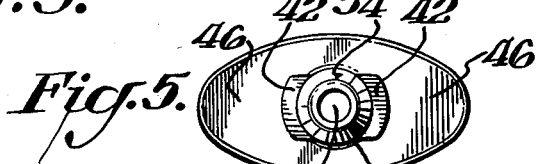
FIG. 5 is an end elevational view of the male member viewed from line 5—5 of FIG. 3; and, FIG. 6 is an enlarged sectional view on line 6—6 of FIG. 1 showing the cooperating members in the locked condition.
Figure 6:
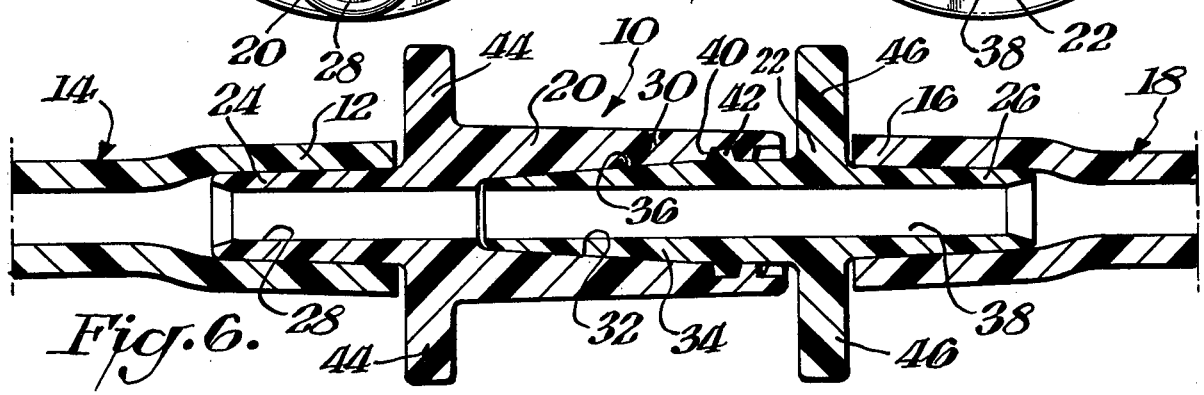

Referring in more particularity to the drawings, the twist-lock connector 10 is utilized for joining together, for instance, one end 12 of a piece of flexible tubing 14 and one end 16 of another piece of flexible tubing 18. The twist-lock connector 10 comprises two cooperating members 20 and 22, the member 20 includes a tubular extension 24 designed to receive the end 12 of the one piece of tubing 14, and the member 22 includes a similar tubular extension 26 designed to receive the end 16 of the other piece of tubing 18. As can be readily understood, the extensions 24, 26 are designed to have the ends of the pieces of tubing stretched thereover in essentially permanent fashion, and outer binding or clamping arrangements, not shown, may also be utilized to secure the ends of the pieces of tubing to the extensions, if desired. In the preferred embodiment, both cooperating members 20, 22 are molded of a rigid plastic material having the desired properties for the contemplated end use.

The cooperating member 20 includes an internal passage 28 and a female portion 30 having an internal opening with an inner conical tapered sealing surface 32. The other cooperating member 22 includes a communicating internal passage 38 and a male portion 34 having a protrusion with an outer conical matingly tapered sealing surface 36. The tapered surfaces 32, 36 are designed for frictional engagement to form a fluid-tight connection with a so-called locking angle taper, after the known fashion.

The twist-lock connector acccordiong to this invention includes rotary cam means associated with the two members 20, 22 whereby relative rotary motion between the two members insures that the tapered sealing surfaces 32, 36 are forced together into intimate frictional contact providing the desired fluid-tight connection and whereby relative longitudinal motion between the two members 20, 22 tending to disengage the sealing surfaces is precluded. The rotary cam means comprises two spiral cam tracks 40 disposed 180° apart in the manner of a double helix associated with the mouth of the female portion of the member 20, and two cam follower lugs 42 disposed 180° from each other associated with the base of the male portion of the member 22 the mouth and the base comprising cylindrical surfaces as illustrated in the drawings.

Thie spiral cam tracks 40 are pitched at a so-called non-locking helix angle, and extend inwardly sufficient to permit at least 180° of relative rotary motion between the two members 20 and 22. When the two members 20 and 22 are placed together in telescoped relationship until the cam follower lugs 42 contact the spiral cam tracks 40, then relative rotary motion between the two members insures that the tapered sealing surfaces 32, 36 are forced together by the cam means into intimate frictional contact providing a fluid-tight connection. With the parts in this locked condition, relative longitudinal motion between the two members is precluded by the cam means because, although the cam means involves a non-locking helix angle, the conical surfaces involve a locking angle which inhibits inadvertent relative rotary motion. This prevents accidental disengagement of the sealing surfaces. To disconnect, it is a simple matter to impart a firm but very slight twisting motion between the two members 20 and 22 to cause a disengagement between the locking angle sealing surfaces 32 and 36 and, with slight longitudinal pressure, cause the two members 20, 22 to virtually fall apart due to the non-locking helix angle of the cam means with an extremely easy and rapid motion.

The locking angle of the tapered surfaces and the nonlocking angle of the cam means may vary depending upon the nature of the material from which the cooperating members are made, but workable angles can readily be determined by those skilled in the art with a small amount of routine experimentation.

To facilitate the easy and rapid manual manipulation of the members 20 and 22 for connecting and disconnecting them as aforesaid, each member includes gripping means for imparting relative longitudinal and rotary motion. While enlarged knurled or other known grippable surfaces are contemplated within the spirit of this invention, the preferred embodiment includes gripping means formed by a pair of laterally protruding ears 44 associated with the member 20, and a similar pair of lateral protruding ears 46 associated with the member 22.

While the above described embodiment constitutes the presently preferred mode of practicing this invention, other embodiments and equivalents are included within the scope of the actual invention, which is claimed as:

I claim:

1. A twist-lock connector for joining together the end of two pieces of flexible tubing comprising two cooperating members made of rigid plastic material, each member including means for connecting with the end of a piece of flexible tubing, one member including a female portion having an internal opening with an inner conical tapered sealing surface, the other member including a male portion having as protrusion with an outer conical matingly tapered sealing surface, the tapered surfaces being dimensioned for locking frictional engagement to form a fluid-tight connection, and rotary cam means involving a non-locking helix angle associated with the two members whereby relative rotary motion between the two members insures that the tapered sealing surfaces are forced together into intimate locking frictional contact providing a fluid-tight connection and whereby relative longitudinal motion between the two members tending to disengage the sealing surfaces is precluded, the improvement wherein said rotary cam means comprises a first cylindrical surface at the mouth of the female portion having a pair of diametrically opposed spiral cam tracks therein, and a second cylindrical surface at the base of the male portion having a pair of diametrically opposed cam follower lugs positioned thereon for cooperation with the cam tracks of the first cylindrical surface.

2. A twist-lock connector as in claim 1 wherein each cooperating member includes at least one laterally protruding ear to facilitate manual relative rotary motion between the two members, the ears being positioned so that they are in longitudinal alignment with each other when the two members are in the locked condition.

3. A twist-lock connector as in claim 1 wherein the cam tracks permit at least 180° of relative rotary motion between the two members.

* * * * *